Feb. 13, 1923.

W. G. SAMPSON ET AL.
PNEUMATIC TIRE PRESSURE GAUGE AND SIGNAL.
FILED JUNE 22, 1920.

1,445,043.

INVENTOR.
Willis G. Sampson
Otis Sampson
BY A. B. Bowman
ATTORNEY

Patented Feb. 13, 1923.

1,445,043

UNITED STATES PATENT OFFICE.

WILLIS G. SAMPSON AND OTIS SAMPSON, OF HANSEN, IDAHO.

PNEUMATIC-TIRE PRESSURE GAUGE AND SIGNAL.

Application filed June 22, 1920. Serial No. 390,698.

*To all whom it may concern:*

Be it known that we, WILLIS G. SAMPSON and OTIS SAMPSON, citizens of the United States, residing at Hansen, in the county of Twin Falls and State of Idaho, have invented certain new and useful Pneumatic-Tire Pressure Gauges and Signals, of which the following is a specification.

Our invention relates to a device to be used in connection with automobile tires by the use of which an audible signal is given when the tire becomes slightly deflated and the objects of our invention are: First, to provide a device to be used in connection with a vehicle tire for producing an audible signal when the tire becomes deflated by reason of leakage or otherwise to a point where it requires re-filling; second, to provide a device of this class which is automatic in its action; third, to provide a device of this class which may be readily applied for use in connection with the vehicle tires and wheels now in use; fourth, to provide a device of this class that is adjustable throughout; fifth, to provide a device of this class which produces a sound readily discernible from other usual noises about an automobile and sixth, to provide a device of this class that is very simple and economical of construction, durable, easy to install, automatic in its action, adjustable throughout and which will not readily deteriorate or get out of order.

Figure 1:
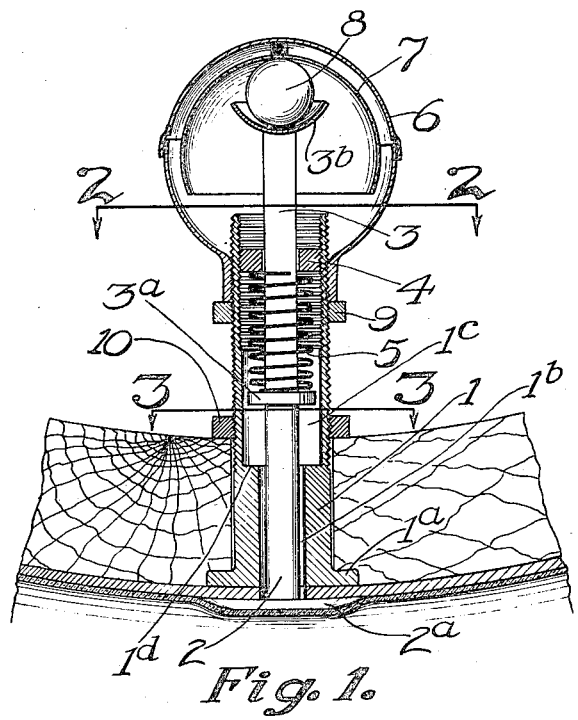
Figure 2:
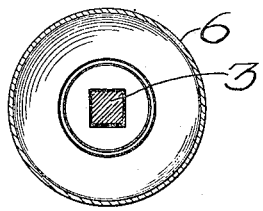
Figure 3:
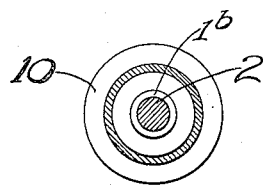

With these and other objects in view as will appear hereinafter our invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a longitudinal sectional view of the device shown positioned on the vehicle wheel ready for use; Fig. 2 is a sectional view through 2—2 of Fig. 1 and Fig. 3 is a sectional view through 3—3 of Fig. 1.

Similar characters of reference refer to similar parts and portions throughout the several views of the drawings.

The tubular casing 1, plunger member 2, plunger member 3, plug 4, spring 5, cap 6, bell member 7, ball 8, lock nut 9 and lock nut 10 constitute the principal parts and portions of our tire bell signal.

The tubular casing 1 is provided on its one end with a flange $1^a$ which is adapted to extend into a recess portion in the felly for supporting the casing 1 in position, its base resting against the face of the rim. It is provided with a central hole $1^b$ extending some distance from its inner end, then it is provided with an enlarged hole $1^c$ and this hole $1^c$ is threaded some distance from its outer end adapted for threads on the plug 4 which is adapted for the adjustment of the spring 5. This casing 1 is also threaded externally. Mounted in the hole $1^b$ is the plunger 2 which is provided with a head $2^a$ against which the tube protector rests, supported by the inflated tube. Mounted in the hole $1^c$ and adapted to engage the outer end of the plunger 2 is another plunger 3 which is provided with an enlarged head $3^a$ which is adapted to engage the shoulder $1^d$ in case the tire becomes very much deflated. Mounted between this head $3^a$ and the plug 4 is a compression spring 5. It will be here noted that this spring 5 may be adjusted by turning this plunger member 3 which is square and carries with it the plug 4 turning it inwardly or outwardly as desired for the proper adjustment of the spring 5. On the outer end of the plunger 3 is a concavo-convex member $3^b$ with its concave side outwardly and adapted for the ball 8 to rest in. Mounted over the outer end of the casing 1 is the cap member 6 which is approximately spherical in form and provided with an extended portion threaded internally adapted to fit onto the threads on the outer surface of the casing 1 and there is provided a lock nut 9 for holding said cap in a certain position on said casing, and providing for the adjustment of said cap members. Secured at its center inside of the cap 6 is a bell member 7 which is a concavo-convex member.

Though we have shown and described a particular construction, combination and arrangement of parts and portions we do not wish to be limited to this particular construction, combination and arrangement but desire to include in the purview of our invention the construction, combination and arrangement substantially as set forth in the appended claims.

It is obvious that with this construction there is provided a device which may be applied to the ordinary tire and rim of a vehicle which will provide an alarm in the form of a bell when the tire becomes deflated to a certain predetermined point which operates as follows: The spring 5 is adjusted by turning the plunger member 3 so that the plug 4 is positioned giving the spring the desired compression. When the tire becomes deflated to a certain extent the spring will force the plunger 2 inwardly by pressure on the plunger 3 which in turn will cause the concavo-convex member 3$^b$ to move inwardly providing clearance for the ball 8 which will be agitated by the movement of the vehicle wheel causing it to strike against the bell member 7 and the concavo-convex member 3$^b$ provides an audible signal to the driver that his tire needs inflation.

Having thus described our invention what we claim as new and desire to secure by Letters Patent is:

1. A device of the class described, including a tubular member extending through the felly of the wheel provided with a central longitudinal hole with an enlarged portion, a plunger reciprocably mounted in said hole, provided with a head engaging the outer surface of the tire tube, another plunger reciprocably mounted in said enlarged portion adapted to engage the inner end of said first mentioned plunger, a plug screwed into said enlarged portion, a compression spring interposed between said plug and the collar on said plunger, a concavo-convex member secured on the outer end of said plunger, another concavo-convex member facing the same supported on the outer end of said cap and a ball interposed between said concavo-convex members adapted to move freely in all directions when said plunger moves inwardly.

2. A device of the class described, including a tubular member extending through the felly of the wheel provided with a central longitudinal hole with an enlarged portion, a plunger reciprocably mounted in said hole, another plunger reciprocably mounted in said enlarged portion adapted to engage the inner end of said first mentioned plunger, a plug screwed into said enlarged portion, a compression spring interposed between said plug and the collar on said plunger, a concavo-convex member secured on the outer end of said plunger, another concavo-convex member facing the same, supported on the outer end of said cap, a ball interposed between said concavo-convex members adapted to move freely in all directions when said plunger moves inwardly and a cap mounted over said concavo-convex member secured to the outer end of said casing.

3. A device of the class described, including a tubular member extending through the felly of the wheel provided with a central longitudinal hole with an enlarged portion, a plunger reciprocably mounted in said hole, another plunger reciprocably mounted in said enlarged portion adapted to engage the inner end of said first mentioned plunger, a plug screwed into said enlarged portion, a compression spring interposed between said plug and the collar on said plunger, a concavo-convex member secured on the outer end of said plunger, another concavo-convex member facing the same, supported on the outer end of said cap, a ball interposed between said concavo-convex members adapted to move freely in all directions when said plunger moves inwardly, a cap mounted over said concavo-convex member secured to the outer end of said casing and a cap mounted over said last mentioned concavo-convex member and adjustably secured to said tubular member.

In testimony whereof, we have hereunto set our hands at Long Beach, California, this 12 day of June, 1920.

WILLIS G. SAMPSON.
OTIS SAMPSON.